US011609755B2

(12) United States Patent
Li (10) Patent No.: US 11,609,755 B2
(45) Date of Patent: Mar. 21, 2023

(54) METHOD FOR UPGRADING MODULES IN UNMANNED AIRCRAFT SYSTEM AND UNMANNED AIRCRAFT SYSTEM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Shenzhen (CN)

(*) Notice: Subject to any disclaimer, the term of this patent is extended or adjusted under 35 U.S.C. 154(b) by 78 days.

(21) Appl. No.: 17/136,493

(22) Filed: Dec. 29, 2020

(65) Prior Publication Data

US 2021/0124569 A1    Apr. 29, 2021

Related U.S. Application Data

(63) Continuation of application No. PCT/CN2018/106557, filed on Sep. 19, 2018.

(30) Foreign Application Priority Data

Jun. 29, 2018 (CN) .......................... 201810697855.2

(51) Int. Cl.
G06F 9/44      (2018.01)
G06F 8/65      (2018.01)

(52) U.S. Cl.
CPC ..................... *G06F 8/65* (2013.01)

(58) Field of Classification Search
CPC .................................................. G06F 8/65
(Continued)

(56) References Cited

U.S. PATENT DOCUMENTS

2017/0371640 A1    12/2017  Choi
2018/0341476 A1*   11/2018  Kitao .................. H04L 67/1097

FOREIGN PATENT DOCUMENTS

CN    101694622 A    4/2010
CN    101907998 A    12/2010
(Continued)

OTHER PUBLICATIONS

The International Search Report dated Mar. 28, 2019; PCT/CN2018/106557.
(Continued)

*Primary Examiner* — Chuck O Kendall (57) ABSTRACT

Embodiments of the present invention relate to the field of unmanned aircraft technologies, and disclose a method for upgrading modules in an unmanned aircraft system. The unmanned aircraft system includes a storage apparatus and at least two to-be-upgraded module groups, each of the at least two to-be-upgraded module groups including at least one to-be-upgraded module, and the storage apparatus including at least two upgrade packages, each of the upgrade packages corresponding to one to-be-upgraded module group; and the method includes: transmitting, by the storage apparatus, at least two upgrade packages to the at least two to-be-upgraded module groups; receiving, by a to-be-upgraded module group in the at least two to-be-upgraded module groups, a corresponding upgrade package; and upgrading to-be-upgraded modules in the to-be-upgraded module group according to the upgrade package. By using the upgrade method, a time for upgrading modules in the unmanned aircraft system can be shortened, thereby improving upgrade efficiency.

18 Claims, 3 Drawing Sheets

(58) Field of Classification Search
USPC .................................................. 717/168–178
See application file for complete search history.

(56) References Cited

FOREIGN PATENT DOCUMENTS

| CN | 103533041 A | 1/2014 |
| CN | 106055373 A | 10/2016 |
| CN | 107409051 | * 11/2017 |
| CN | 107454129 A | 12/2017 |
| CN | 107580322 A | 1/2018 |

OTHER PUBLICATIONS

The First Chinese Office Action dated Apr. 2, 2020; Appln No. 201810697855.2.

* cited by examiner

FIG. 7

METHOD FOR UPGRADING MODULES IN UNMANNED AIRCRAFT SYSTEM AND UNMANNED AIRCRAFT SYSTEM

CROSS REFERENCE TO RELATED APPLICATIONS

This application is a continuation application of International Application No. PCT/CN2018/106557, filed on Sep. 19, 2018, which claims priority of Chinese Patent Application No. 201810697855.2, filed on Jun. 29, 2018, which is incorporated herein by reference in its entirely.

BACKGROUND

Technical Field

Embodiments of the present invention relate to the field of unmanned aircraft technologies, and in particular, to a method for upgrading modules in an unmanned aircraft system and an unmanned aircraft system.

Related Art

To better satisfy user requirements, improve stability or the like, modules in an unmanned aircraft system usually need to be upgraded periodically or aperiodically. Generally, an unmanned aircraft system includes a plurality of modules. For example, there are a camera module, a gimbal module, a visual module, four electronic tuning modules, a smart battery module, an ultrasonic module, a flight control module, an aircraft image transmission module and the like on an aircraft side of the unmanned aircraft system; and there are a remote control single-chip microcomputer module, a ground image transmission module, a remote control panel module and the like on a ground side of the unmanned aircraft system. In addition, all the modules are independent hardware and software systems, and are connected through a serial interface or a network. To upgrade modules in the unmanned aircraft system is to upgrade each module in the unmanned aircraft system.

Currently, modules in an unmanned aircraft system are generally upgraded in a module-by-module sequential-upgrading manner. Specifically, a storage apparatus storing upgrade packages transmits a corresponding upgrade package to a module in the unmanned aircraft system, and after upgrade of the module is completed according to the upgrade package, a corresponding upgrade package is then sequentially transmitted to a next module, until upgrade of all the modules in the unmanned aircraft system is completed.

During implementation of the present invention, the inventor finds that there is at least the following problem in the related art: because there are a large quantity of modules in an unmanned aircraft system, upgrading the modules in the unmanned aircraft system in the module-by-module sequential-upgrading manner needs to consume a quite long time, and consequently has low upgrade efficiency.

SUMMARY

Embodiments of the present application provide a method for upgrading modules in an unmanned aircraft system, which can shorten a time for upgrading modules in an unmanned aircraft system, thereby improving upgrade efficiency.

In the embodiments of the present invention, the following technical solutions are disclosed:

The embodiments of the present invention provide a method for upgrading modules in an unmanned aircraft system. The unmanned aircraft system includes a storage apparatus and at least two to-be-upgraded module groups, each of the at least two to-be-upgraded module groups including at least one to-be-upgraded module, and the storage apparatus including at least two upgrade packages, each of the upgrade packages corresponding to one to-be-upgraded module group; and the method includes:

transmitting, by the storage apparatus, at least two upgrade packages to the at least two to-be-upgraded module groups;

receiving, by a to-be-upgraded module group in the at least two to-be-upgraded module groups, a corresponding upgrade package; and upgrading to-be-upgraded modules in the to-be-upgraded module group according to the upgrade package.

In some embodiments, the transmitting, by the storage apparatus, at least two upgrade packages to the at least two to-be-upgraded module groups includes:

transmitting, by the storage apparatus, at least two upgrade packages to one of the at least two to-be-upgraded module groups at a time, and transmitting, by using the to-be-upgraded module group, the at least two upgrade packages to another to-be-upgraded module group in the at least two to-be-upgraded module groups.

In some embodiments, the receiving, by a to-be-upgraded module group in the at least two to-be-upgraded module groups, a corresponding upgrade package includes:

receiving, by the to-be-upgraded module group in the at least two to-be-upgraded module groups, part of or all upgrade packages in the at least two upgrade packages; and obtaining, by the to-be-upgraded module group, upgrade packages corresponding to the to-be-upgraded module groups from the received part of or all upgrade packages.

In some embodiments, the to-be-upgraded module group in the at least two to-be-upgraded module groups includes a first-level to-be-upgraded module; and the receiving, by a to-be-upgraded module group in the at least two to-be-upgraded module groups, a corresponding upgrade package includes:

receiving, by the first-level to-be-upgraded module, the upgrade package corresponding to the to-be-upgraded module group.

In some embodiments, the to-be-upgraded module in the at least two to-be-upgraded module groups further includes second-level to-be-upgraded modules, and the method further includes:

splitting, by the first-level to-be-upgraded module, the upgrade package corresponding to the to-be-upgraded module group into upgrade sub-packages corresponding to the to-be-upgraded modules in the to-be-upgraded module group; and transmitting, by the first-level to-be-upgraded module, upgrade sub-packages corresponding to the second-level to-be-upgraded modules in the to-be-upgraded module group to the second-level to-be-upgraded modules; and the upgrading to-be-upgraded modules in the to-be-upgraded module group according to the upgrade package includes:

upgrading the to-be-upgraded modules in the to-be-upgraded module group according to the corresponding upgrade sub-packages.

In some embodiments, there are at least two second-level to-be-upgraded modules, the at least two second-level to-be-upgraded modules being connected in a serial interface manner; and the transmitting, by the first-level to-be-upgraded module, upgrade sub-packages corresponding to the second-level to-be-upgraded modules in the to-be-upgraded module group to the second-level to-be-upgraded modules includes:

sequentially transmitting, by the first-level to-be-upgraded module, a corresponding upgrade sub-package to one of the at least two second-level to-be-upgraded modules according to a connection order, and after upgrade of the second-level to-be-upgraded module is completed according to the corresponding upgrade sub-package, transmitting a corresponding upgrade sub-package to a next second-level to-be-upgraded module.

In some embodiments, the method further includes:

determining an upgrade progress according to a transmission situation of the at least two upgrade packages and an upgrade situation of the to-be-upgraded module groups in the at least two to-be-upgraded module groups; and displaying the upgrade progress.

In some embodiments, the determining an upgrade progress according to a transmission situation of the at least two upgrade packages and an upgrade situation of the to-be-upgraded module groups in the at least two to-be-upgraded module groups includes:

determining, when the at least two upgrade packages are transmitted in the at least two to-be-upgraded module groups, a duration having been spent on transmission of the at least two upgrade packages; and determining the upgrade progress according to a ratio of the duration having been spent on transmission to a preset total upgrade duration.

In some embodiments, the determining an upgrade progress according to a transmission situation of the at least two upgrade packages and an upgrade situation of the to-be-upgraded module groups in the at least two to-be-upgraded module groups includes:

determining, when transmission of the at least two upgrade packages is completed and the at least two to-be-upgraded module groups are at an upgrade stage, a duration for completing upgrade of upgraded modules in the at least two to-be-upgraded module groups; and determining the upgrade progress according to a ratio of the duration for completing the upgrade of the upgraded modules to the preset total upgrade duration.

In some embodiments, the upgrade progress is displayed by a remote control panel module in a remote control device in the unmanned aircraft system.

In some embodiments, the at least two to-be-upgraded module groups include the remote control panel module, and the upgrading to-be-upgraded modules in the to-be-upgraded module group according to the upgrade package includes:

after it is determined that upgrade of all other to-be-upgraded modules in the at least two to-be-upgraded module groups is completed, upgrading the remote control panel module according to an upgrade package corresponding to the remote control panel module.

An unmanned aircraft system is provided, and includes: a storage apparatus and at least two to-be-upgraded module groups, each of the at least two to-be-upgraded module groups including at least one to-be-upgraded module, and the storage apparatus including at least two upgrade packages, each of the upgrade packages corresponding to one to-be-upgraded module group;

at least one processor; and a memory communicatively connected to the at least one processor, the memory storing instructions executable by the at least one processor, the instructions being executed by the at least one processor, to enable the at least one processor to perform the foregoing method.

According to the embodiments of the present invention, a storage apparatus transmits at least two upgrade packages to at least two to-be-upgraded module groups, and after the to-be-upgraded module groups receive corresponding upgrade packages, to-be-upgraded modules in the to-be-upgraded module groups can be upgraded according to the corresponding upgrade package instead of being sequentially upgraded in a module-by-module manner, so as to shorten a time for upgrading modules in an unmanned aircraft system, thereby improving upgrade efficiency.

BRIEF DESCRIPTION OF THE DRAWINGS

To describe the technical solutions in the embodiments of the present invention or in existing technologies more clearly, the accompanying drawings required for describing the embodiments or existing technologies are briefly described below. Apparently, the accompanying drawings in the following description show merely some embodiments of the present invention, and a person of ordinary skill in the art may still derive drawings of other embodiments from these accompanying drawings without creative efforts.

DETAILED DESCRIPTION

The technical solutions in the embodiments of the present invention are described below in detail with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

In addition, technical features involved in implementations of the present invention that are described below may be combined with each other provided that no conflict occurs.

Figure 1:
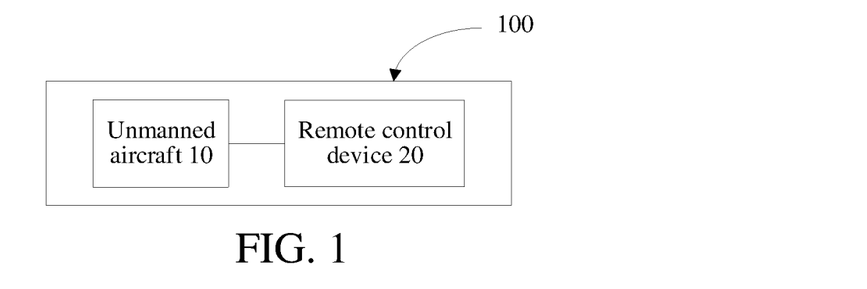
FIG. 1 is a schematic diagram of an application environment of a method for upgrading modules in an unmanned aircraft system according to an embodiment of the present invention.

FIG. 1 is a schematic diagram of an application environment of a method for upgrading modules in an unmanned aircraft system according to an embodiment of the present invention. The application environment includes: an unmanned aircraft system 100. The unmanned aircraft system 100 includes an unmanned aircraft 10 and a remote control device 20. When modules in the unmanned aircraft system 100 are upgraded, a connection between the unmanned aircraft 10 and the remote control device 20 is established, to upgrade the unmanned aircraft system 100. Further, an upgrade progress may be displayed on a remote control panel module of the remote control device 20.

The unmanned aircraft system 100 includes a storage apparatus and at least two to-be-upgraded module groups. Each of the at least two to-be-upgraded module groups includes at least one to-be-upgraded module, and the storage apparatus includes at least two upgrade packages, each of the upgrade packages corresponding to one to-be-upgraded module group. The upgrade package is used for upgrading to-be-upgraded modules in the corresponding to-be-upgraded module group.

In an implementation, for the unmanned aircraft 10 in the unmanned aircraft system 100, to-be-upgraded module groups in the unmanned aircraft 10 may include a camera upgrade module group, an aircraft image transmission upgrade module group and the like. To-be-upgraded modules included in the camera upgrade module group include a camera upgrade module; and to-be-upgraded modules included in the aircraft image transmission upgrade module group include a visual module, a gimbal module, four electronic tuning modules, a smart battery module, an ultrasonic module, a flight control module, an aircraft image transmission module and the like. Certainly, upgrade modules in the unmanned aircraft 10 may form at least two to-be-upgraded module groups according to another grouping manner. For example, the upgrade modules may form at least two to-be-upgraded module groups according to factors such as a mutual connection and a degree of a mutual functional association.

In an implementation, for the remote control device 20 in the unmanned aircraft system 100, the remote control device 20 includes a ground image transmission upgrade module group, a remote control panel upgrade module group and the like. To-be-upgraded modules included in the ground image transmission upgrade module group include a remote control single-chip microcomputer module and a ground image transmission module; and to-be-upgraded modules included in the remote control panel upgrade module group include a remote control panel module and the like. Certainly, upgrade modules in the remote control device 20 may form at least two to-be-upgraded module groups according to another grouping manner. For example, the upgrade modules may form at least two to-be-upgraded module groups according to factors such as a mutual connection and a degree of a mutual functional association.

The storage apparatus may be fixedly disposed on the unmanned aircraft 10 in the unmanned aircraft system 100, or may be in pluggable connection to the unmanned aircraft 10 in the unmanned aircraft system 100. For example, the unmanned aircraft 10 is provided with an interface configured to accommodate the storage apparatus. The storage apparatus may be accommodated in the interface, and implement communicative connection to the to-be-upgraded modules in the to-be-upgraded module groups in the unmanned aircraft 10 through the interface, to transmit upgrade packages stored in the storage apparatus to the to-be-upgraded module groups.

Herein, the storage apparatus may be a volatile memory, for example, a random access memory (RAM) such as a static random access memory (SRAM) or a double data rate synchronous dynamic random access memory (DDR SDRAM). The storage apparatus may alternatively be a non-volatile memory such as a flash memory, a hard disk drive (HDD) or a solid-state drive (SSD). The storage apparatus may alternatively include a combination of the foregoing types of memories.

At least two upgrade packages may be pre-stored in the storage apparatus; alternatively, the at least two upgrade packages may be obtained in real time by the storage apparatus through connection to a terminal device or server. For example, transmission manners through which the terminal device or server transmits the upgrade packages to the storage apparatus may include: when the storage apparatus is fixedly disposed in the unmanned aircraft 10, the terminal device or server may transmit the upgrade packages to the storage apparatus in a wireless connection manner; alternatively, the terminal device or server writes the upgrade packages into the storage apparatus in a wired connection manner.

After obtaining the upgrade packages, the storage apparatus may store the upgrade packages. When the unmanned aircraft system 100 needs to be upgraded, the to-be-upgraded module groups in the unmanned aircraft system 100 may revoke the upgrade packages in the storage apparatus; alternatively, the unmanned aircraft system 100 may trigger the storage apparatus to transmit the upgrade packages to the to-be-upgraded module groups, which is not limited herein.

In this embodiment of the present application, the unmanned aircraft 10 may include: a fixed-wing unmanned aircraft, a multi-rotor unmanned aircraft and the like. The unmanned aircraft may refer to an unmanned aerial vehicle (UAV). In some other embodiments, the unmanned aircraft may alternatively be another aircraft, for example, an unmanned surface vessel.

The remote control device 20 may be any suitable device having a remote control function, for example, a remote controller.

The storage apparatus may be any apparatus having a storage function, which may be disposed inside the unmanned aircraft 10, or may be removable, such as an SD card. The storage apparatus is configured to store upgrade packages for upgrading modules in the unmanned aircraft system 100. The terminal device may include terminal devices such as a smartphone, a personal computer and a wearable intelligent device. In an implementation, the terminal device may obtain the upgrade packages of the unmanned aircraft system 100 through connection to a server.

To enable the unmanned aircraft system 100 to better satisfy user requirements or improve stability of the unmanned aircraft system 100, modules in the unmanned aircraft system 100 usually need to be upgraded, that is, to upgrade to-be-upgraded modules in the to-be-upgraded module groups in the unmanned aircraft system 100, so as to optimize functions of the unmanned aircraft system 100, thereby providing a user with better experience. Because there are a large quantity of modules in an unmanned aircraft system, currently, upgrading the modules in the unmanned aircraft system in a module-by-module sequential-upgrading manner needs to consume a quite long time, and consequently has low upgrade efficiency.

Based on the foregoing problem, with reference to the foregoing application scenario, a main objective of the embodiments of the present invention is to provide a method for upgrading modules in an unmanned aircraft system, which can shorten a time for upgrading modules in an unmanned aircraft system, thereby improving upgrade efficiency.

The embodiments of the present invention are further described below with reference to the accompanying drawings.

Embodiment 1

Figure 2:
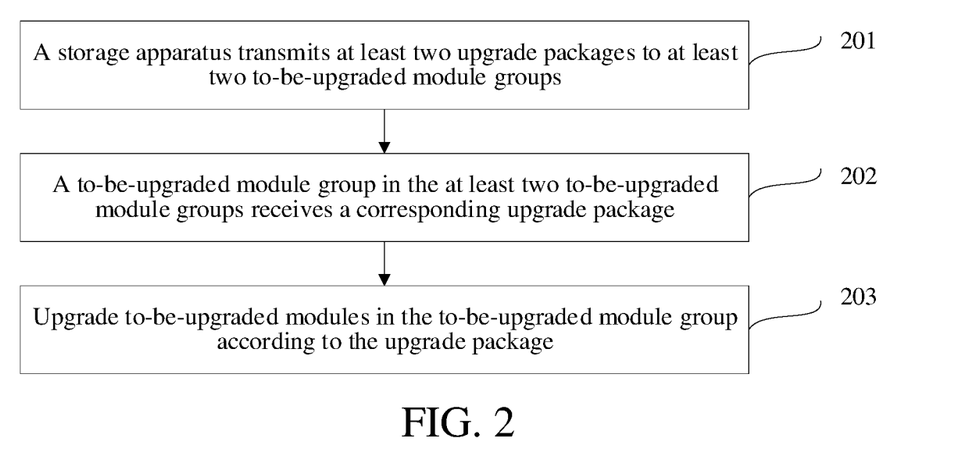
FIG. 2 is a schematic flowchart of a method for upgrading modules in an unmanned aircraft system according to an embodiment of the present invention.

FIG. 2 is a schematic flowchart of a method for upgrading modules in an unmanned aircraft system according to an embodiment of the present invention. The method may be used to upgrade modules in an unmanned aircraft system. The unmanned aircraft system includes a storage apparatus and at least two to-be-upgraded module groups, each of the at least two to-be-upgraded module groups including at least one to-be-upgraded module, and the storage apparatus including at least two upgrade packages, each of the upgrade packages corresponding to one to-be-upgraded module group.

Referring to FIG. 2, the method for upgrading modules in an unmanned aircraft system includes the following steps:

201: The storage apparatus transmits at least two upgrade packages to the at least two to-be-upgraded module groups.

Figure 3:
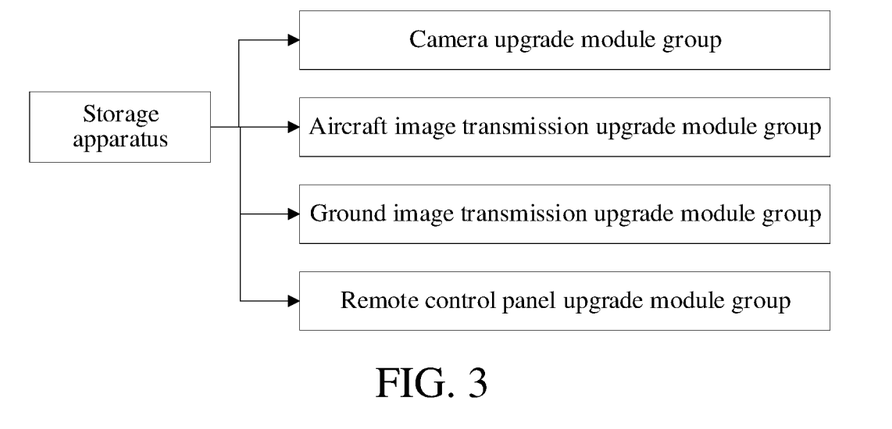
FIG. 3 is a schematic diagram of to-be-upgraded module groups according to an embodiment of the present invention.

The unmanned aircraft system may include at least two to-be-upgraded module groups. For example, as shown in FIG. 3, the at least two to-be-upgraded module groups include: a camera upgrade module group, an aircraft image transmission upgrade module group, a ground image transmission upgrade module group, a remote control panel upgrade module group and the like. Because each upgrade package corresponds to one to-be-upgraded module group, accordingly, the storage apparatus includes at least two upgrade packages: a camera upgrade package, an aircraft image transmission upgrade package, a ground image transmission upgrade package, a remote control panel upgrade package and the like.

The storage apparatus may transmit, after receiving instructions for invoking or reading upgrade packages from at least two to-be-upgraded module groups, the upgrade packages to the at least two to-be-upgraded module groups. Any to-be-upgraded module in the unmanned aircraft system may send, by using a communication link, an instruction for invoking or reading an upgrade package to the storage apparatus. For example, the storage apparatus may receive an instruction for invoking or reading an upgrade package from a camera module that is directly connected to the storage apparatus, to transmit the upgrade package. For example, the storage apparatus may transmit all of the camera upgrade package, the aircraft image transmission upgrade package, the ground image transmission upgrade package and the remote control panel upgrade package to the at least two to-be-upgraded module groups at a time. Alternatively, the storage apparatus may transmit at least two upgrade packages of the camera upgrade package, the aircraft image transmission upgrade package, the ground image transmission upgrade package and the remote control panel upgrade package to the at least two to-be-upgraded module groups at a time.

In an implementation, the storage apparatus transmits at least two upgrade packages to the at least two to-be-upgraded module groups, and may first transmit the at least two upgrade packages to a to-be-upgraded module group, in the at least two to-be-upgraded module groups, that is directly connected to or has a connection path to the storage apparatus. The to-be-upgraded module group receives an upgrade package in the at least two upgrade packages that corresponds to the to-be-upgraded module group, and may transmit remaining upgrade packages to other to-be-upgraded module groups by using a communication link, until all the upgrade packages transmitted by the storage apparatus are transmitted to corresponding to-be-upgraded module groups.

The to-be-upgraded module group in the at least two to-be-upgraded module groups receives part of or all upgrade packages in the at least two upgrade packages; and obtains upgrade packages corresponding to the to-be-upgraded module groups from the received part of or all upgrade packages.

Figure 6:
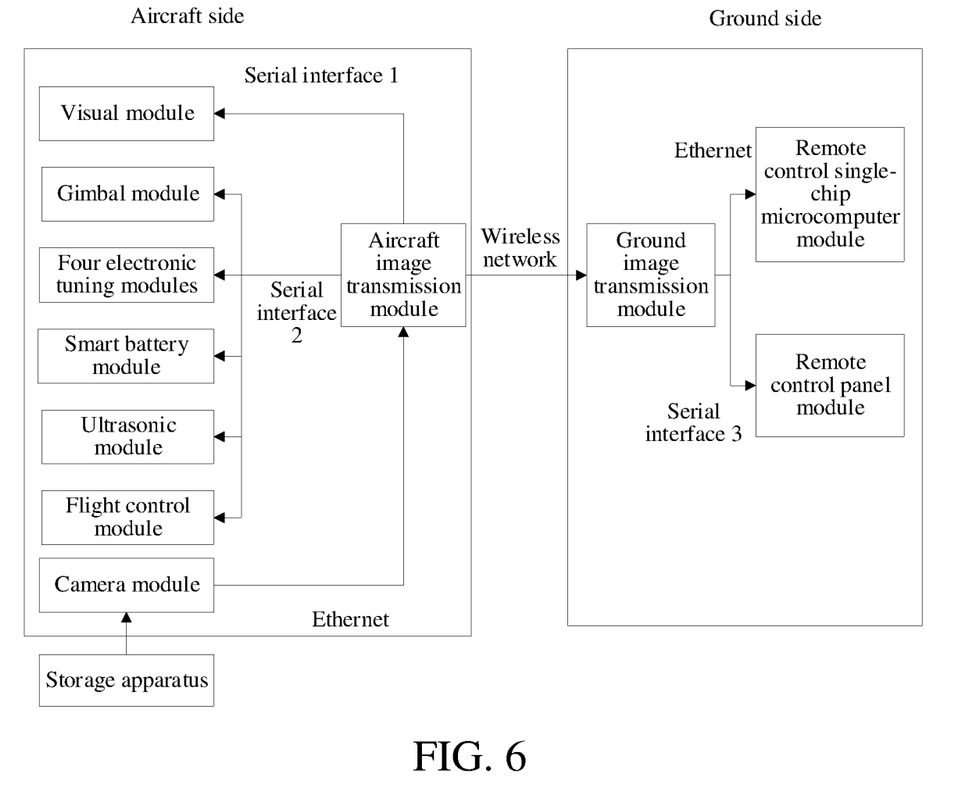
FIG. 6 is a schematic diagram of upgrade package transmission in a currently adopted module-by-module sequential-upgrading manner.

The to-be-upgraded module groups in FIG. 3 are used as an example, and a description is made by using examples with reference to connection manners of the to-be-upgraded module groups in FIG. 6. Because the camera upgrade module group is directly communicatively connected to the storage apparatus, the storage apparatus first transmits the camera upgrade package, the aircraft image transmission upgrade package, the ground image transmission upgrade package and the remote control panel upgrade package to a memory in the camera upgrade module group, for example, a flash memory in the camera upgrade module group. Then, the camera upgrade module group transmits upgrade packages other than the camera upgrade package, that is, the aircraft image transmission upgrade package, the ground image transmission upgrade package and the remote control panel upgrade package, to corresponding to-be-upgraded module groups, for example, flash memories in the to-be-upgraded module groups.

Alternatively, the storage apparatus transmits at least two upgrade packages to the at least two to-be-upgraded module groups, and may first transmit the at least two upgrade packages to a to-be-upgraded module group, in the at least two to-be-upgraded module groups, that is directly connected to or has a connection path to the storage apparatus, and the to-be-upgraded module group distributes the received at least two upgrade packages, until all the to-be-upgraded module groups have received respectively corresponding upgrade packages.

The to-be-upgraded module groups in FIG. 3 are used as an example, and a description is made by using examples with reference to connection manners of the to-be-upgraded module groups in FIG. 6. The storage apparatus may transmit the camera upgrade package, the aircraft image transmission upgrade package, the ground image transmission upgrade package and the remote control panel upgrade package to the camera upgrade module group. The camera upgrade module group transmits the remote control panel upgrade package to the remote control panel upgrade module group through the aircraft image transmission module and the ground image transmission module, and then sequentially transmits the ground image transmission upgrade package and the aircraft image transmission upgrade package, until a camera stores only the camera upgrade package.

The to-be-upgraded module groups may be updated together after transmission of the upgrade packages is completed, that is, each of the to-be-upgraded module groups has received an upgrade package.

For example, the camera upgrade module group first receives the camera upgrade package, and then subsequent module upgrade may be performed on the camera upgrade module group after transmission of upgrade packages corresponding to other to-be-upgraded module groups is completed.

Alternatively, after receiving a corresponding upgrade package, a to-be-upgraded module group may be upgraded by using the corresponding upgrade package.

For example, after receiving a corresponding upgrade package, the remote control panel module group may be upgraded.

202: A to-be-upgraded module group in the at least two to-be-upgraded module groups receives a corresponding upgrade package.

The to-be-upgraded module groups in FIG. 3 are used as an example. The camera upgrade module group receives the camera upgrade package, the aircraft image transmission upgrade module group receives the aircraft image transmission upgrade package, the ground image transmission upgrade module group receives the ground image transmission upgrade package, and the remote control panel upgrade module group receives the remote control panel upgrade package.

Specifically, that a to-be-upgraded module group in the at least two to-be-upgraded module groups receives a corresponding upgrade package includes: the to-be-upgraded module group in the at least two to-be-upgraded module groups receives part of or all upgrade packages in the at least two upgrade packages; and obtains upgrade packages corresponding to the to-be-upgraded module groups from the received part of or all upgrade packages. For example, the camera upgrade module group receives all of the at least two upgrade packages, that is, the camera upgrade package, the aircraft image transmission upgrade package, the ground image transmission upgrade package and the remote control panel upgrade package; and the to-be-upgraded module groups other than the camera upgrade module group obtain corresponding upgrade packages thereof from received part of upgrade packages. For example, the aircraft image transmission upgrade module group obtains the aircraft image transmission upgrade package from a received aircraft image transmission upgrade package.

203: Upgrade to-be-upgraded modules in the to-be-upgraded module group according to the upgrade package.

After the to-be-upgraded module group in the at least two to-be-upgraded module groups receives the corresponding upgrade package, the to-be-upgraded modules in the to-be-upgraded module group may be upgraded according to the corresponding upgrade package thereof. Compared with upgrading modules in an unmanned aircraft system in a module-by-module sequential-upgrading manner currently, the upgrade method in this embodiment can effectively shorten a time for upgrading modules in an unmanned aircraft system, thereby improving upgrade efficiency.

For example, the to-be-upgraded module groups in FIG. 3 are used as an example. A total time $T_{1all}$ required for upgrading modules in an unmanned aircraft system in a module-by-module sequential-upgrading manner is: $T_{1all}=T_1+T_2+T_3+T_4$, where $T_1=T_{1t}+T_{1u}$, $T_2=T_{2t}+T_{2u}$, $T_3=T_{3t}+T_{3u}$, and $T_4=T_{4t}+T_{4u}$. $T_1$ is a total upgrade time of the camera upgrade module group, $T_{1t}$ is a transmission time of the camera upgrade package, and $T_{1u}$ is an upgrade time required by to-be-upgraded modules in the camera upgrade module group; $T_2$ is a total upgrade time of the aircraft image transmission upgrade module group, $T_{2t}$ is a transmission time of the aircraft image transmission upgrade package, and $T_{2u}$ is an upgrade time required by to-be-upgraded modules in the aircraft image transmission upgrade module group; $T_3$ is a total upgrade time of the ground image transmission upgrade module group, $T_{3t}$ is a transmission time of the ground image transmission upgrade package, and $T_{3u}$ is an upgrade time required by to-be-upgraded modules in the ground image transmission upgrade module group; and $T_4$ is a total upgrade time of the remote control panel upgrade module group, $T_{4t}$ is a transmission time of the remote control panel upgrade package, and $T_{4u}$ is an upgrade time required by to-be-upgraded modules in the remote control panel upgrade module group.

In this embodiment, a total time $T_{2all}$ required for upgrading the modules in the unmanned aircraft system is: $T_{2all}=T_{2t\_all}+T_{2u\_all}$, where a total transmission time $T_{2t\_all}$ for the camera upgrade package, the aircraft image transmission upgrade package, the ground image transmission upgrade package and the remote control panel upgrade package is: $T_{2t\_all}=\max\{T_{1t}, T_{2t}, T_{3t}, T_{4t}\}$, and a total upgrade time $T_{2u\_all}$ for the to-be-upgraded modules in the camera upgrade module group, the to-be-upgraded modules in the aircraft image transmission upgrade module group, the to-be-upgraded modules in the ground image transmission upgrade module group and the to-be-upgraded modules in the remote control panel upgrade module group is: $T_{2u\_all}=\max\{T_{1u}, T_{2u}, T_{3u}, T_{4u}\}$.

It is assumed that, the transmission time of the camera upgrade package is it $T_{1t}=100$ s, the upgrade time required by the to-be-upgraded modules in the camera upgrade module group is $T_{1u}=160$ s, the transmission time of the aircraft image transmission upgrade package is $T_{2t}=100$ s, the upgrade time require by the to-be-upgraded modules in the aircraft image transmission upgrade module group is $T_{2u}=160$ s, the transmission time of the ground image transmission upgrade package is $T_{3t}=100$ s, the upgrade time required by the to-be-upgraded modules in the ground image transmission upgrade module group is $T_{3u}=160$ s, the transmission time of the remote control panel upgrade package is $T_{4t}=60$ s, and the upgrade time required by the to-be-upgraded modules in the remote control panel upgrade module group is $T_{4u}=60$ s. Then, the total time required for upgrading the modules in the unmanned aircraft system in a module-by-module sequential-upgrading manner is $T_{1all}=900$ s, while the total time required for upgrading the modules in the unmanned aircraft system by using the method in this embodiment of the present invention is $T_{2all}=260$ s. Therefore, it indicates that the module upgrade method in this embodiment can effectively shorten a time for upgrading the modules in the unmanned aircraft system, thereby improving upgrade efficiency.

In some embodiments, in consideration of experience on a user interface, that is, to make it convenient for a user to learn an upgrade progress of the modules in real time, the upgrade progress may be displayed by the to-be-upgraded modules in the remote control panel upgrade module group in the unmanned aircraft system. In this case, due to a need to provide the upgrade progress of the modules to the user, the to-be-upgraded modules in the remote control panel upgrade module group are upgraded at last. In this case, the total upgrade time for the to-be-upgraded modules in the camera upgrade module group, the to-be-upgraded modules in the aircraft image transmission upgrade module group, the to-be-upgraded modules in the ground image transmission upgrade module group and the to-be-upgraded modules in the remote control panel upgrade module group is $T_{2u\_all}/\max\{T_{1u}, T_{2u}, T_{3u}\}+T_{4u}$, and then $T_{2all}=320$ s. Even if display of the upgrade progress is taken into consideration, the required total time thereof is still less than the total time for upgrading the modules in the current upgrade manner.

In this embodiment of the present invention, the storage apparatus transmits at least two upgrade packages to at least two to-be-upgraded module groups, and after the to-be-upgraded module groups receive corresponding upgrade packages, to-be-upgraded modules in the to-be-upgraded module groups can be upgraded according to the corresponding upgrade package instead of being sequentially upgraded in a module-by-module manner, so as to shorten a time for upgrading modules in an unmanned aircraft system, thereby improving upgrade efficiency.

Embodiment 2

Figure 4:
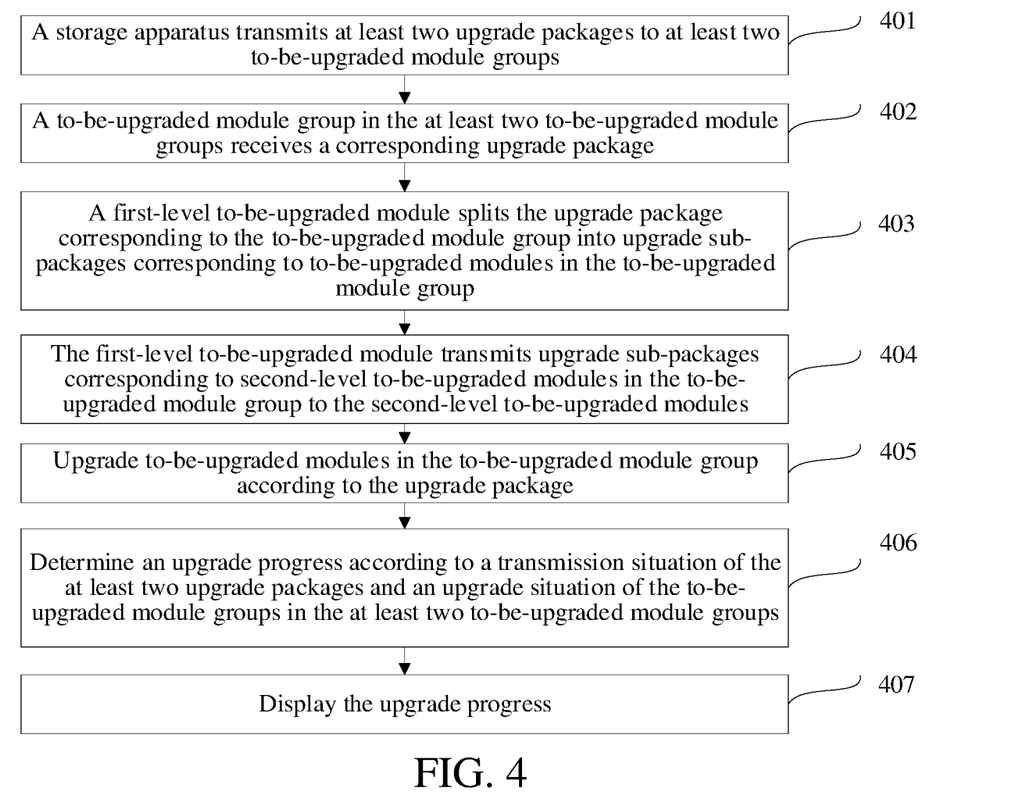
FIG. 4 is a schematic flowchart of another method for upgrading modules in an unmanned aircraft system according to an embodiment of the present invention.

FIG. 4 is a schematic flowchart of another method for upgrading modules in an unmanned aircraft system according to an embodiment of the present invention. The method may be used to upgrade modules in an unmanned aircraft system. The unmanned aircraft system includes a storage apparatus and at least two to-be-upgraded module groups, each of the at least two to-be-upgraded module groups including at least one to-be-upgraded module, and the storage apparatus including at least two upgrade packages, each of the upgrade packages corresponding to one to-be-upgraded module group.

Referring to FIG. 4, the method for upgrading modules in an unmanned aircraft system includes the following steps:

401: The storage apparatus transmits at least two upgrade packages to the at least two to-be-upgraded module groups.

402: A to-be-upgraded module group in the at least two to-be-upgraded module groups receives a corresponding upgrade package.

It should be noted that the foregoing steps 401 and 402 respectively have the same technical features as steps 201 and 202 in the method for upgrading modules in an unmanned aircraft system shown in FIG. 2. Therefore, for specific implementations thereof, reference may be made to corresponding descriptions in steps 201 and 202 in the foregoing embodiment. Details are not described again in this embodiment.

Figure 5:
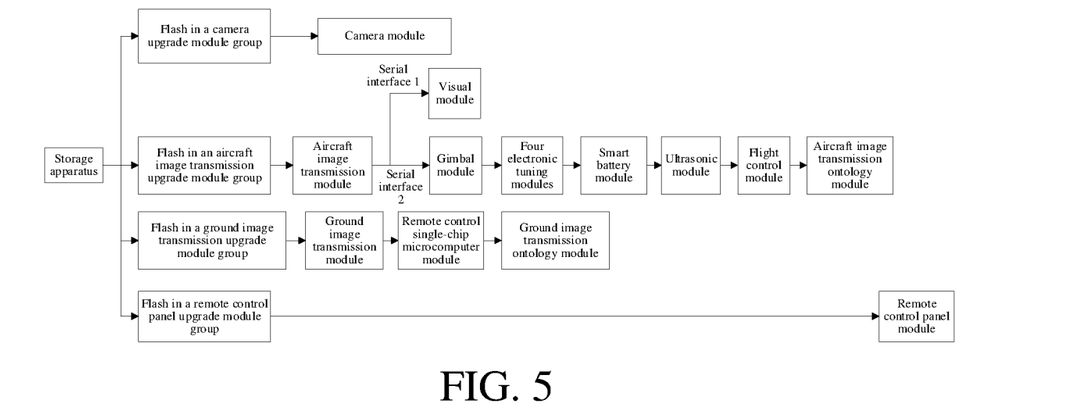
FIG. 5 is a schematic diagram of upgrade package transmission according to an embodiment of the present invention.

In this embodiment, that a to-be-upgraded module group in the at least two to-be-upgraded module groups receives a corresponding upgrade package further includes: a first-level to-be-upgraded module in the to-be-upgraded module group in the at least two to-be-upgraded module groups receives the upgrade package corresponding to the to-be-upgraded module group. As shown in FIG. 5, the at least two to-be-upgraded module groups include: a camera upgrade module group, an aircraft image transmission upgrade module group, a ground image transmission upgrade module group and a remote control panel upgrade module group. To-be-upgraded modules in the foregoing to-be-upgraded module groups include a first-level to-be-upgraded module and second-level to-be-upgraded modules. By using the aircraft image transmission upgrade module group as an example, an aircraft image transmission module is a first-level upgrade module; and a visual module, a gimbal module, four electronic tuning modules, a smart battery module, an ultrasonic module, a flight control module and an aircraft image transmission ontology module are second-level upgrade modules.

403: The first-level to-be-upgraded module splits the upgrade package corresponding to the to-be-upgraded module group into upgrade sub-packages corresponding to the to-be-upgraded modules in the to-be-upgraded module group.

When the to-be-upgraded module group includes at least two to-be-upgraded modules, a to-be-upgraded module in the to-be-upgraded module group splits the received upgrade package corresponding to the to-be-upgraded module group. By using FIG. 5 as an example, the aircraft image transmission module splits an aircraft image transmission upgrade package into a visual module upgrade sub-package, a gimbal module upgrade sub-package, four electronic tuning module upgrade sub-packages, a smart battery module upgrade sub-package, an ultrasonic module upgrade sub-package, a flight control module upgrade sub-package and an aircraft image transmission ontology module upgrade sub-package. The ground image transmission module splits a ground image transmission upgrade package into a remote control single-chip microcomputer module upgrade sub-package and a ground image transmission ontology module upgrade sub-package.

404: The first-level to-be-upgraded module transmits upgrade sub-packages corresponding to the second-level to-be-upgraded modules in the to-be-upgraded module group to the second-level to-be-upgraded modules.

In an implementation, there are at least two second-level to-be-upgraded modules, the at least two second-level to-be-upgraded modules being connected in a serial interface manner.

That the first-level to-be-upgraded module transmits upgrade sub-packages corresponding to the second-level to-be-upgraded modules in the to-be-upgraded module group to the second-level to-be-upgraded modules includes: sequentially transmitting, by the first-level to-be-upgraded module, a corresponding upgrade sub-package to one of the at least two second-level to-be-upgraded modules according to a connection order, and after upgrade of the second-level to-be-upgraded module is completed according to the corresponding upgrade sub-package, transmitting a corresponding upgrade sub-package to a next second-level to-be-upgraded module.

For example, the aircraft image transmission module is connected to the visual module by using a serial interface 1, and is connected to the gimbal module by using a serial interface 2. The aircraft image transmission module may transmit an upgrade sub-package corresponding to the visual module to the visual module by using the serial interface 1, and may transmit a corresponding upgrade sub-package to another module by using the serial interface 2. Because the serial interface 1 and the serial interface 2 are independent of each other, the visual module and other modules in the aircraft image transmission upgrade module group are upgraded in parallel. When the gimbal module is connected to the four electronic tuning modules, the smart battery module, the ultrasonic module, the flight control module and the aircraft image transmission ontology module in a serial manner, the aircraft image transmission module sequentially transmits corresponding upgrade sub-packages to the gimbal module, the four electronic tuning modules, the smart battery module, the ultrasonic module, the flight control module and the aircraft image transmission ontology module, and after one module is upgraded by using a corresponding upgrade sub-package, transmits a corresponding upgrade sub-package to a next module.

Exemplarily, the aircraft image transmission module may sequentially transmit corresponding upgrade sub-packages of the modules according to a connection order of the modules. The aircraft image transmission module may sequentially perform transmission in descending or ascending order of distances according to the connection order. For example, the aircraft image transmission module may first transmit the upgrade sub-package corresponding to the gimbal module, and after upgrade of the gimbal module is completed according to the gimbal module upgrade sub-package, transmit a corresponding upgrade sub-package to a next second-level to-be-upgraded module of the gimbal module, such as the four electronic tuning modules, for the four electronic tuning modules to complete module upgrade, and the rest may be deduced by analogy. Alternatively, the aircraft image transmission module first transmits the upgrade sub-package corresponding to the flight control module, and after upgrade of the flight control module is completed according to the corresponding upgrade sub-package, transmits a corresponding upgrade sub-package to a next second-level to-be-upgraded module of the gimbal module, such as the ultrasonic module.

Certainly, the aircraft image transmission module may alternatively sequentially transmit the corresponding upgrade sub-packages of the modules according to a user requirement or rule, which is not limited herein.

405: Upgrade to-be-upgraded modules in the to-be-upgraded module group according to the upgrade package.

The upgrading to-be-upgraded modules in the to-be-upgraded module group according to the upgrade package includes: upgrading the to-be-upgraded modules in the to-be-upgraded module group according to the corresponding upgrade sub-packages.

By using the upgrade method in this embodiment of the present invention, a time for upgrading the modules in the unmanned aircraft system can be shortened, thereby improving upgrade efficiency.

A specific description is made on that the method for upgrading modules in an unmanned aircraft system in this embodiment of the present invention shortens an upgrade time below with reference to FIG. 5 and FIG. 6. FIG. 5 is a schematic diagram of upgrade package transmission in the method for upgrading modules in an unmanned aircraft system according to an embodiment of the present invention. FIG. 6 is a schematic diagram of upgrade package transmission in a current upgrade method.

As shown in FIG. 6, the unmanned aircraft system is divided into four network nodes; the camera module is connected to the aircraft image transmission module through Ethernet; the aircraft image transmission module is connected to the ground image transmission module through a wireless network; and the ground image transmission module is connected to the remote control panel module through Ethernet. The several modules communicate with each other by using a network protocol. The aircraft image transmission module communicates with the visual module by using the serial interface 1, and communicates with the gimbal module, the electronic tuning modules, the smart battery module, the ultrasonic module and the flight control module by using the serial interface 2. The ground image transmission module communicates with the remote control single-chip microcomputer module by using a serial interface 3.

For the convenience of network transmission, four independent upgrade packages are required: a camera upgrade package, an aircraft image transmission upgrade package (including a visual upgrade sub-package, a gimbal upgrade sub-package, electronic tuning upgrade sub-packages, a smart battery upgrade sub-package, an ultrasonic upgrade sub-package, a flight control upgrade sub-package and an aircraft image transmission ontology upgrade sub-package), a ground image transmission upgrade package (including a remote control single-chip microcomputer upgrade sub-package and an aircraft image transmission ontology upgrade sub-package) and a remote control panel upgrade package.

When the camera upgrade package is directly transmitted from the storage apparatus such as an SD card to the camera module, the camera module may be directly upgraded. It is assumed that a transmission time is $T_{1t}$ and an upgrade time is $T_{1u}$, and then a total upgrade time of the camera module is $T_1=T_{1t}+T_{1u}$.

The aircraft image transmission upgrade package is read from the storage apparatus by using the camera module, then is transmitted to the aircraft image transmission module through a network and stored in a flash of the aircraft image transmission module (assuming that a time is $T_{2t}$), and subsequently is transmitted to modules for upgrade by using serial interfaces. It is assumed that a time spent on transmission of the serial interface 1 and upgrade of the visual module is $T_{mu}$; similarly, a time for the gimbal module is $T_{iu}$, a time for a first electronic tuning module is $T_{e1u}$, a time for a second electronic tuning module is $T_{e2u}$, a time for a third electronic tuning module is $T_{e3u}$, a time for a fourth electronic tuning module is $T_{e4u}$, a time for the smart battery module is $T_{bu}$, a time for the ultrasonic module is $T_{su}$, a time for the flight control module is $T_{fu}$, and a time for the aircraft image transmission ontology module is $T_{au}$. Then, a total upgrade time of the aircraft image transmission module is $T_2=T_{2t}+T_{mu}+T_{iu}+T_{e1u}+T_{e2u}+T_{e3u}+T_{e4u}+T_{bu}+T_{su}+T_{fu}+T_{au}$.

The ground image transmission upgrade package is read from the storage apparatus by using the camera module, then is transmitted to the aircraft image transmission module through a network and stored in the flash of the aircraft image transmission module, subsequently is transmitted to the ground image transmission module through a wireless network and stored in a flash of the ground image transmission module, and then is transmitted to the remote control single-chip microcomputer module for upgrade by using the serial interface 3. It is assumed that a time spent on transmission to the flash of the ground image transmission module is $T_{3t}$, an upgrade time of the remote control single-chip microcomputer module is $T_{ru}$, and an upgrade time of the ground image transmission ontology module is $T_{gu}$. Then, a total upgrade time of the ground image transmission module is $T_3=T_{3t}+T_{ru}+T_{gu}$.

For the remote control panel upgrade package that is from the storage apparatus to the aircraft image transmission module, then transferred to the ground image transmission module, and finally to a flash of the remote control panel module, a required time is $T_{4t}$, and an upgrade time is $T_{4u}$. Then, a total upgrade time of the remote control panel module is $T_4=T_{4t}+T_{4u}$.

According to the foregoing manner, a total time required for completing upgrade of all the to-be-upgraded modules in the unmanned aircraft system is:

$$T_{3all}=T_1+T_2+T_3+T_4=T_{1t}+T_{1u}+T_{2t}+T_{mu}+T_{iu}+T_{e1u}+T_{e2u}+T_{e3u}+T_{e4u}+T_{bu}+T_{su}+T_{fu}+T_{au}+T_{3t}+T_{ru}+T_{gu}+T_{4t}+T_{4u}$$

It is assumed that, $T_{1t}=100$ s, $T_{1u}=160$ s, $T_{2t}=100$ s, $T_{mu}=160$ s, $T_{iu}+T_{e1u}+T_{e2u}+T_{e3u}+T_{e4u}+T_{bu}+T_{su}+T_{fu}+T_{au}=160$ s, $T_{3t}=100$ s, $T_{ru}+T_{gu}=160$ s, $T_{4t}=60$ s, and $T_{4u}=60$ s, then $T_{3all}=1060$ s.

The at least two to-be-upgraded module groups include the remote control panel module. To make it convenient for a user to learn an upgrade progress in real time, the upgrade progress is displayed by the remote control panel module in a remote control device in the unmanned aircraft system. Therefore, the remote control panel module is upgraded at last. The upgrading to-be-upgraded modules in the to-be-upgraded module group according to the upgrade package includes: after it is determined that upgrade of all other to-be-upgraded modules in the at least two to-be-upgraded module groups is completed, upgrading the remote control panel module according to an upgrade package corresponding to the remote control panel module.

As shown in FIG. 5, an upgrade process of the modules in the unmanned aircraft system in this embodiment of the present invention may be divided into three main parts: 1, a process in which four upgrade packages are transmitted to flashes of the to-be-upgraded module groups in parallel from the storage apparatus such as an SD card; 2, a parallel upgrade process of to-be-upgraded modules in the camera upgrade module group, to-be-upgraded modules in the aircraft image transmission upgrade module group and to-be-upgraded modules in the ground image transmission upgrade module group; and 3, an upgrade process of to-be-upgraded modules in the remote control panel upgrade module group.

1) The process in which the four upgrade packages are transmitted to flashes of corresponding to-be-upgraded module groups is a parallel transmission process. The camera upgrade module group is directly communicatively connected to the storage apparatus, so that transmission of the camera upgrade package is completed first; and upgrade packages in the storage apparatus are read and distributed by using the camera upgrade module group, so that the camera upgrade module group can be upgraded only after transmission of other upgrade packages is completed. Other to-be-upgraded module groups such as the aircraft image transmission upgrade module group are in a similar case, so that a parallel upgrade process can be entered together only after all transmission is completed. A total time $T_{4t\_all}$ required for the transmission process is a maximum value of $T_{1t}$, $T_{2t}$, $T_{3t}$ and $T_{4t}$, that is, $T_{4t\_all}=\max\{T_{1t}, T_{2t}, T_{3t}, T_{4t}\}$.

2) The parallel upgrade process is that the camera upgrade package, the aircraft image transmission upgrade package and the ground image transmission upgrade package are upgraded in parallel. An upgrade time of the camera module is $T_{1u}$. The aircraft image transmission module is connected to the visual module by using the serial interface 1, and is connected to the gimbal module by using the serial interface 2. In addition, to-be-upgraded modules connected by the serial interface 1 and the serial interface 2 are upgraded in parallel. An upgrade time spent on the visual module is $T_{mu}$. Because a large amount of data exchange is involved during upgrade of to-be-upgraded modules connected by the serial interface 2, the to-be-upgraded modules can only be made to be connected in a serial manner. That is, the gimbal module is connected to the four electronic tuning modules, the smart battery module, the ultrasonic module, the flight control module and the aircraft image transmission ontology module in a serial manner, and an upgrade time required by the gimbal module is $T_{22}=T_{iu}+T_{e1u}+T_{e2u}+T_{e3u}+T_{e4u}+T_{bu}+T_{su}+T_{fu}+T_{au}$. A maximum value $\max\{T_{iu}+T_{e1u}+T_{e2u}+T_{e3u}+T_{e4u}+T_{bu}+T_{su}+T_{fu}+T_{au}+T_{mt}\}$ of $T_{22}$ and $T_{mu}$ is used as a time required for completing module upgrade of all the to-be-upgraded modules in the aircraft image transmission upgrade module. A time required for completing all upgrade of the ground image transmission module is $T_{ru}+T_{gu}$.

Therefore, a time required by the second upgrade process is:

$$T_u = \max\{T_{1u}, \max\{T_{iu}+T_{e1u}+T_{e2u}+T_{e3u}+T_{e4u}+T_{bu}+T_{su}+T_{fu}+T_{au}, T_{mt}\}, T_{ru}+T_{gu}\}$$

3) Because the remote control panel module displays the upgrade progress, the remote control panel module is upgraded at last, and a time for the remote control panel module is $T_{4u}$.

Based on the above, a total upgrade time for upgrading the modules in the unmanned aircraft system in this embodiment of the present invention is $T_{4all}=T_{4t\_all}+T_u+T_{4u}$, that is, $$T_{4all} = \max\{T_{1t}, T_{2t}, T_{3t}, T_{4t}\} + \{\max\{T_{1u}, \max\{T_{iu}+T_{e1u}+T_{e2u}+T_{e3u}+T_{e4u}+T_{bu}+T_{su}+T_{fu}+T_{au}, T_{mt}\}, T_{ru}+T_{gu}\} + T_{4u}$$

Similar to the foregoing assumptions, $\max\{T_{1t}, T_{2t}, T_{3t}, T_{4t}\}=100$ s and $\max\{160 \text{ s}, \max\{160 \text{ s}, 160 \text{ s}\}, 160 \text{ s}\}=160$ s can be obtained, and then the total time is $T_{4all}=320$ s.

Therefore, by adopting the module upgrade method in this embodiment of the present invention, the time for upgrading the modules in the unmanned aircraft system can be effectively shortened, thereby improving upgrade efficiency.

406: Determine an upgrade progress according to a transmission situation of the at least two upgrade packages and an upgrade situation of the to-be-upgraded module groups in the at least two to-be-upgraded module groups.

The determining an upgrade progress according to a transmission situation of the at least two upgrade packages and an upgrade situation of the to-be-upgraded module groups in the at least two to-be-upgraded module groups includes: determining, when the at least two upgrade packages are transmitted in the at least two to-be-upgraded module groups, a duration having been spent on transmission of the at least two upgrade packages; and determining the upgrade progress according to a ratio of the duration having been spent on transmission to a preset total upgrade duration. When transmission of the at least two upgrade packages is completed and the at least two to-be-upgraded module groups are at an upgrade stage, the duration for completing upgrade of upgraded modules in the at least two to-be-upgraded module groups is determined; and the upgrade progress is determined according to a ratio of the duration for completing the upgrade of the upgraded modules to the preset total upgrade duration.

Specifically, the upgrade progress is represented by adopting an upgrade progress percentage, the denominator of the upgrade progress percentage is a total upgrade time, that is, the preset total upgrade duration, and there may be different manners of calculating the denominator and the numerator of the upgrade progress percentage according to the transmission situation and the upgrade situation.

1) When the at least two upgrade packages are transmitted in the at least two to-be-upgraded module groups, the duration having been spent on transmission is determined based on a total file transmission percentage. For example, a total volume of the foregoing four upgrade packages is S, and a volume of files having been transmitted is $S_0$, and then according to the ratio of the duration having been spent on transmission to the preset total upgrade duration, it is determined that the upgrade progress is:

$$\frac{\frac{S_0}{S} * \max\{T_{1t}, T_{2t}, T_{3t}, T_{4t}\}}{T_{4all}}$$

2) When transmission of the at least two upgrade packages is completed and the at least two to-be-upgraded module groups are at an upgrade stage, the upgrade progress is determined according to the ratio of the duration for completing the upgrade of the upgraded modules in the at least two to-be-upgraded module groups to the preset total upgrade duration. The preset total upgrade duration may be set in a customized way, or may be estimated based on previous experience. In a case that time is insufficient, the preset total upgrade duration is usually estimated based on previous experience. Therefore, to determine the upgrade progress more accurately, the upgrade progress may be calculated in real time according to the upgrade time spent on the upgraded modules and an estimated upgrade time of modules that are not upgraded, to correct the preset total upgrade duration.

Before each to-be-upgraded module is upgraded, a first message identifying upgrading the to-be-upgraded module is transmitted, and after upgrade of the to-be-upgraded module is completed, a second message identifying completion of the upgrade of the to-be-upgraded module is transmitted, so that an actual upgrade time of the to-be-upgraded module is determined based on time points at which the first message and the second message are transmitted, to correct the preset total upgrade duration.

Specifically, the correcting the preset total upgrade duration includes: when there are to-be-upgraded modules connected in a serial interface manner in the at least two to-be-upgraded modules, the preset total upgrade duration is corrected according to an upgrade time of to-be-upgraded modules on which upgrade is completed.

Figure 7:
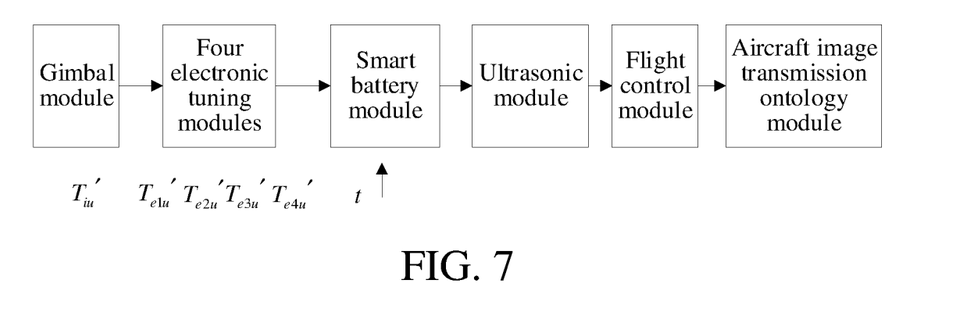
FIG. 7 is a schematic diagram of modules connected by using a serial interface 2 according to an embodiment of the present invention.

Because during upgrade of the modules in the unmanned aircraft system, a quantity of modules connected by the serial interface 2 is the largest and the modules are most complex, a description is made by using the modules connected by the serial interface 2 as an example. As shown in FIG. 7, a module that is currently being upgraded is the smart battery module, a current upgrade time of the smart battery module is t, an upgrade time spent on the gimbal module previous to the smart battery module is $T_{iu}'$, and upgrade times spent on the four electronic tuning modules are respectively $T_{e1u}'$, $T_{e2u}'$, $T_{e3u}'$ and $T_{e4u}'$, and then a corrected time progress is:

$$\frac{T_{iu}' + T_{e1u}' + T_{e2u}' + T_{e3u}' + T_{e4u}' + t}{T_{iu}' + T_{e1u}' + T_{e2u}' + T_{e3u}' + T_{e4u}' + T_{bu} + T_{su} + T_{fu} + T_{au}}$$

407: Display the upgrade progress.

To make it convenient for a user to learn an upgrade progress of the modules in real time, the upgrade progress is displayed in real time by the remote control panel module in the remote control device in the unmanned aircraft system. The upgrade progress may be displayed by using an upgrade bar or in another upgrade form.

It may be understood that in some embodiments, steps 406 and 407 may not be mandatory steps in different embodiments; in addition, in this embodiment of the present invention, according to the description in this embodiment of the present invention, a person of ordinary skill in the art may understand that steps 401 to 407 may be performed in a different sequence in different embodiments when no conflict occurs.

It should be further noted that, for technical details that are not specifically described in steps 401 to 407 in this embodiment of the present invention, reference may be made to the specific description in the foregoing embodiment.

In this embodiment of the present invention, the storage apparatus transmits at least two upgrade packages to at least two to-be-upgraded module groups, and after the to-be-upgraded module groups receive corresponding upgrade packages, to-be-upgraded modules in the to-be-upgraded module groups can be upgraded according to the corresponding upgrade package instead of being sequentially upgraded in a module-by-module manner, so as to shorten a time for upgrading modules in an unmanned aircraft system, thereby improving upgrade efficiency. Moreover, when the at least two upgrade packages are transmitted in the at least two to-be-upgraded module groups, the upgrade progress is calculated in real time according to the upgrade time spent on the upgraded modules and an estimated upgrade time of modules that are not upgraded, thereby improving the accuracy in determining the upgrade progress.

In an embodiment, the present invention further provides an unmanned aircraft system. The unmanned aircraft system includes a storage apparatus, at least two to-be-upgraded module groups, at least one processor and a memory communicatively connected to the at least one processor.

Each of the at least two to-be-upgraded module groups includes at least one to-be-upgraded module, and the storage apparatus includes at least two upgrade packages, each of the upgrade packages corresponding to one to-be-upgraded module group. The memory stores instructions executable by the at least one processor, the instructions being executed by the at least one processor, to enable the at least one processor to perform the method in the foregoing embodiment.

Based on the descriptions of the foregoing embodiments, a person of ordinary skill in the art may clearly understand that the embodiments may be implemented by software in addition to a universal hardware platform, or by hardware. A person of ordinary skill in the art may understand that all or some of the processes of the method in the embodiments may be implemented by a computer program instructing relevant hardware. The program may be stored in a computer-readable storage medium. During execution of the program, the processes of the method embodiments may be performed. The storage medium may be a magnetic disk, an optical disc, a read-only memory (ROM), a RAM or the like.

Finally, it should be noted that the foregoing embodiments are merely used for describing the technical solutions of the present invention, but are not intended to limit the present invention. Under the concept of the present invention, the technical features in the foregoing embodiments or different embodiments may be combined, the steps may be implemented in any sequence, and there may be many other changes in different aspects of the present invention as described above. For brevity, those are not provided in detail. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method for upgrading modules in an unmanned aircraft system, wherein the unmanned aircraft system comprises a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group; and the method comprises:

transmitting, by the storage apparatus, at least two upgrade packages to one of the at least two to-be-upgraded module groups at a time, and transmitting, by using the to-be-upgraded module group, the at least two upgrade packages to another to-be-upgraded module group in the at least two to-be-upgraded module groups;

wherein the storage apparatus is in pluggable connection to the unmanned aircraft in the unmanned aircraft system, and at least two upgrade packages is pre-stored in the storage apparatus;

receiving, by a to-be-upgraded module group in the at least two to-be-upgraded module groups, a corresponding upgrade package; and upgrading to-be-upgraded modules in the to-be-upgraded module group according to the upgrade package.

2. The method according to claim 1, wherein the receiving, by a to-be-upgraded module group in the at least two to-be-upgraded module groups, a corresponding upgrade package comprises:

receiving, by the to-be-upgraded module group in the at least two to-be-upgraded module groups, part of or all upgrade packages in the at least two upgrade packages; and obtaining, by the to-be-upgraded module group, upgrade packages corresponding to the to-be-upgraded module groups from the received part of or all upgrade packages.

3. The method according to claim 1, wherein the to-be-upgraded module group in the at least two to-be-upgraded module groups comprises a first-level to-be-upgraded module;

and the receiving, by a to-be-upgraded module group in the at least two to-be-upgraded module groups, a corresponding upgrade package comprises:

receiving, by the first-level to-be-upgraded module, the upgrade package corresponding to the to-be-upgraded module group.

4. The method according to claim 3, wherein the to-be-upgraded module in the at least two to-be-upgraded module groups further comprises second-level to-be-upgraded modules, and the method further comprises:

splitting, by the first-level to-be-upgraded module, the upgrade package corresponding to the to-be-upgraded module group into upgrade sub-packages corresponding to the to-be- upgraded modules in the to-be-upgraded module group; and transmitting, by the first-level to-be-upgraded module, upgrade sub-packages corresponding to the second-level to-be-upgraded modules in the to-be-upgraded module group to the second-level to-be-upgraded modules; and the upgrading to-be-upgraded modules in the to-be-upgraded module group according to the upgrade package comprises:

upgrading the to-be-upgraded modules in the to-be-upgraded module group according to the corresponding upgrade sub-packages.

5. The method according to claim 4, wherein there are at least two second-level to-be-upgraded modules, the at least two second-level to-be-upgraded modules being connected in a serial interface manner; and the transmitting, by the first-level to-be-upgraded module, upgrade sub-packages corresponding to the second-level to-be-upgraded modules in the to-be-upgraded module group to the second-level to-be-upgraded modules comprises:

sequentially transmitting, by the first-level to-be-upgraded module, a corresponding upgrade sub-package to one of the at least two second-level to-be-upgraded modules according to a connection order, and after upgrade of the second-level to-be-upgraded module is completed according to the corresponding upgrade sub-package, transmitting a corresponding upgrade sub-package to a next second-level to-be-upgraded module.

6. The method according to claim 1, further comprising:

determining an upgrade progress according to a transmission situation of the at least two upgrade packages and an upgrade situation of the to-be-upgraded module groups in the at least two to-be-upgraded module groups; and displaying the upgrade progress.

7. The method according to claim 6, wherein the determining an upgrade progress according to a transmission situation of the at least two upgrade packages and an upgrade situation of the to-be-upgraded module groups in the at least two to-be-upgraded module groups comprises:

determining, when the at least two upgrade packages are transmitted in the at least two to- be-upgraded module groups, a duration having been spent on transmission of the at least two upgrade packages; and determining the upgrade progress according to a ratio of the duration having been spent on transmission to a preset total upgrade duration.

8. The method according to claim 7, wherein the determining an upgrade progress according to a transmission situation of the at least two upgrade packages and an upgrade situation of the to-be-upgraded module groups in the at least two to-be-upgraded module groups comprises:

determining, when transmission of the at least two upgrade packages is completed and the at least two to-be-upgraded module groups are at an upgrade stage, a duration for completing upgrade of upgraded modules in the at least two to-be-upgraded module groups; and determining the upgrade progress according to a ratio of the duration for completing the upgrade of the upgraded modules to the preset total upgrade duration.

9. The method according to claim 6, wherein the upgrade progress is displayed by a remote control panel module in a remote control device in the unmanned aircraft system.

10. The method according to claim 9, wherein the at least two to-be-upgraded module groups comprise the remote control panel module, and the upgrading to-be-upgraded modules in the to-be-upgraded module group according to the upgrade package comprises:

after it is determined that upgrade of all other to-be-upgraded modules in the at least two to-be-upgraded module groups is completed, upgrading the remote control panel module according to an upgrade package corresponding to the remote control panel module.

11. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;

at least one processor; and a memory communicatively connected to the at least one processor, the memory storing instructions executable by the at least one processor, the instructions being executed by the at least one processor, to enable the at least one processor to perform the method according to claim 1.

12. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 3.

13. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 4.

14. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 4.

15. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 5.

16. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 6.

17. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 7.

18. An unmanned aircraft system, comprising: a storage apparatus and at least two to-be-upgraded module groups, each of the at least two to-be-upgraded module groups comprising at least one to-be-upgraded module, and the storage apparatus comprising at least two upgrade packages, each of the upgrade packages corresponding to one to-be-upgraded module group;
 at least one processor; and
 a memory communicatively connected to the at least one processor,
 the memory storing instructions executable by the at least one processor, the instructions being executed by the at least one processor, to enable the at least one processor to perform the method according to claim 8.

\* \* \* \* \*